UNITED STATES PATENT OFFICE.

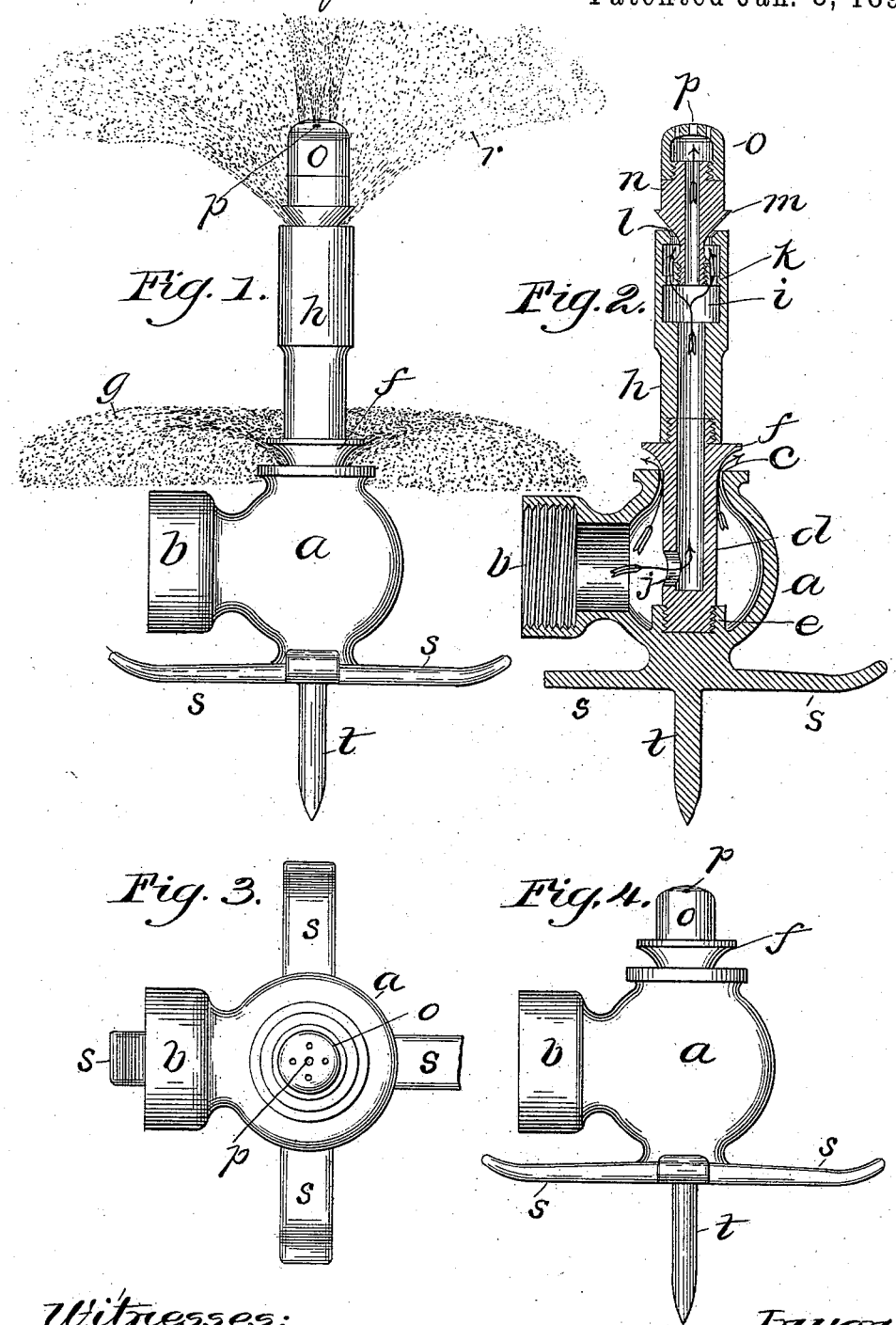

JOHN H. MELAVIN, OF CAMBRIDGE, MASSACHUSETTS.

LAWN-SPRINKLER.

SPECIFICATION forming part of Letters Patent No. 532,281, dated January 8, 1895.

Application filed May 18, 1894. Serial No. 511,692. (No model.)

*To all whom it may concern:*

Be it known that I, JOHN H. MELAVIN, of Cambridge, in the county of Middlesex and State of Massachusetts, have invented certain new and useful Improvements in Lawn-Sprinklers, of which the following is a specification.

This invention has relation to that class of lawn sprinklers which throw a fine spray of water and which are left in stationary position upon the lawn for a time in order that the same may be thoroughly watered in its vicinity without personal attention.

It is the purpose of the invention to provide a lawn sprinkler which will cast a fine spray to a great distance from the sprinkler, and cover the space from center to circumference to all intents and purposes uniformly.

To these ends my invention consists of a lawn sprinkler having means for admitting water through its base, a circular aperture being formed above its base, and a deflector to deflect the thin circular film or sheet issuing from the circular opening outward therefrom, and a pipe extending centrally upward from the circular opening and provided in its upper end with fine holes through which a spray may be thrown upward in order to water the space not watered by the spray issuing from the circular opening, all as I will now proceed to describe and claim.

Reference is to be had to the annexed drawings and to the letters marked thereon, forming a part of this specification, the same letters designating the same parts or features, as the case may be, wherever they occur.

Of the drawings—Figure 1 is a side elevation of my improved lawn sprinkler showing the manner in which the spray issues from the sprinkler, the spray being represented, as it were, in central vertical section. Fig. 2 is a vertical central sectional view of the device, as shown in Fig. 1. Fig. 3 is a top plan view of the invention. Fig. 4 is a side elevation of a modified form of the invention.

In the drawings—*a* designates the hollow base which is provided with a coupling part, *b*, so that a hose may be attached to the base and water under pressure supplied thereto.

The base is provided with a circular opening, *c*, in its top, through which there extends a short pipe, *d*, which is screwed into the bottom of the base, as at *e*. The said pipe, *d*, is provided at its upper end with a flaring flange, *f*, so that the thin spray of water issuing from the opening, *c*, around the pipe, *d*, may be directed outward, as shown at *g* in Fig. 1.

Screwed into the upper end of the short pipe, *d*, is a pipe, *h*, the opening of which coincides at its lower end with the opening or hollow of the pipe, *d*. In its upper part the pipe, *h*, is provided with a chamber, *i*, into which water entering the pipe, *d*, through the opening, *j*, will pass. From the chamber, *i*, the water passes through a partition, *k*, through an opening, *l*, in the top of the pipe, *h*, where the water is deflected upward by a flaring flange, *m*, on a short pipe, *n*, screwed into a projection on the partition, *k*.

A nozzle, *o*, is screwed upon the top of the pipe, *n*, and this nozzle is provided in its upper end with small openings or holes, *p*, so that water passing through the pipe, *n*, may issue in a substantially vertical spray, *q*, (Fig. 1,) and so sprinkle or wet the central part of the ground over which the sprinkler acts. The water issuing through the circular opening, *l*, of the pipe, *h*, is directed more nearly upward than the spray, *g*, issuing through the circular opening, *c*. The spray issuing through the circular opening, *l*, is designated by the letter, *r*, in Fig. 1. In this way the spray, *g*, thrown out by the sprinkler will be cast to a very great distance, but at the same time there will be left in the central part of the ground covered by this spray a portion which will not be as well watered as the outer edges, and this central portion will be supplied by the sprays, *q* and, *r*.

In cases where the water pressure is not very great the central pipe, *h*, may be omitted, and the short pipe, *n*, screwed upon the pipe, *d*, as represented in Fig. 4, or the pipe, *n*, may be made an integral part of the pipe, *h*.

In order to anchor the sprinkler upon the lawn I provide it with bracing arms, *s*, extending out laterally from the bottom of the base, *a*, and I may further provide the said base with a central spike or pin, *t*, which projects vertically downward from the base.

In addition to employing my sprinkler for the purpose of sprinkling lawns, it is evident that the construction may be employed with satisfactory effect in the construction of fountains, and hence I do not limit myself in any way to the use of the invention.

Having thus explained the nature of the invention and described a way of constructing and using the same, though without attempting to set forth all of the forms in which it may be made, or all of the modes of its use, it is declared that what is claimed is—

1. A lawn-sprinkler comprising in its construction a hollow base for the admission of water therethrough and provided with a circular aperture in its top, a pipe adapted to receive water from the base extending through said aperture, and provided with a deflector above said aperture, and having holes or openings in its top.

2. A lawn-sprinkler comprising in its construction a hollow base for the admission of water therethrough and provided with a circular aperture in its top, a pipe adapted to receive water from the base extending through said aperture, and provided with a deflector above said aperture, and having holes or openings in its top, and a second circular opening and deflector in said pipe intermediate of the first mentioned circular opening and the top of the pipe.

In testimony whereof I have signed my name to this specification, in the presence of two subscribing witnesses, this 12th day of May, A. D. 1894.

JOHN H. MELAVIN.

Witnesses:
C. F. BROWN,
A. D. HARRISON.